(12) United States Patent
Brookhart

(10) Patent No.: US 8,837,787 B2
(45) Date of Patent: Sep. 16, 2014

(54) SYSTEM AND METHOD FOR ASSOCIATING A PHOTO WITH A DATA STRUCTURE NODE

(75) Inventor: Chris Brookhart, Lehi, UT (US)

(73) Assignee: Ancestry.com Operations Inc., Provo, UT (US)

( * ) Notice: Subject to any disclaimer, the term of this patent is extended or adjusted under 35 U.S.C. 154(b) by 241 days.

(21) Appl. No.: 13/440,811

(22) Filed: Apr. 5, 2012

(65) Prior Publication Data
US 2013/0266194 A1  Oct. 10, 2013

(51) Int. Cl.
G06K 9/62 (2006.01)
G06K 9/46 (2006.01)

(52) U.S. Cl.
USPC .......................................... 382/118; 382/115

(58) Field of Classification Search
None
See application file for complete search history.

(56) References Cited

U.S. PATENT DOCUMENTS

| | | | |
|---|---|---|---|
| 7,184,578 B2 | 2/2007 | Simon et al. | |
| 7,215,828 B2 | 5/2007 | Luo | |
| 7,912,246 B1 | 3/2011 | Moon et al. | |
| 8,036,417 B2 | 10/2011 | Gallagher et al. | |
| 8,041,082 B1 | 10/2011 | Baluja | |
| 8,666,198 B2 * | 3/2014 | Shochat et al. | 382/305 |
| 2007/0098303 A1 | 5/2007 | Gallagher et al. | |
| 2009/0192967 A1 | 7/2009 | Luo et al. | |
| 2009/0310863 A1 * | 12/2009 | Gallagher et al. | 382/182 |
| 2010/0217743 A1 | 8/2010 | Ueki | |
| 2011/0222724 A1 | 9/2011 | Yang et al. | |
| 2012/0054190 A1 * | 3/2012 | Peters | 707/741 |
| 2012/0314962 A1 * | 12/2012 | Holland et al. | 382/218 |

OTHER PUBLICATIONS

Author Unknown, "Device Enables Computer to Identify Whether User Is Male or Female," Science Daily, Apr. 5, 2011, retrieved on May 16, 2012 from http://www.sciencedaily.com/releases/2011/04/110405084254.htm.
Bekios-Calfa, J., et al., "Revisiting Linear Discrimination Techniques in Gender Recognition," IEEE Transactions on Pattern Analysis and Machine Intelligence, Apr. 2011, pp. 858-864, vol. 33, No. 4.
Bolin, M., et al., "An Automatic Facial Feature Finding System for Portrait Images," Proceedings of IS&T's 2002 PICS Conference, 2002, pp. 226-231.
Cootes, T., et al., "Constrained Active Appearance Models," 8th International Conference on Computer Vision, Jul. 2001, pp. 748-754, vol. 1, IEEE Computer Society Press.
Jones, M., et al., "Fast Multi-view Face Detection," Mitsubishi Electric Research Laboratories, Aug. 2003, 11 pages, Cambridge, MA.
Yuille, A., et al., "Feature Extraction from Faces Using Deformable Templates," International Journal of Computer Vision, Feb. 1992, pp. 99-111, vol. 8, No. 2, Kluwer Academic Publishers, Netherlands.

* cited by examiner

*Primary Examiner* — Atiba O Fitzpatrick
*Assistant Examiner* — Thomas A James
(74) *Attorney, Agent, or Firm* — Kilpatrick Townsend & Stockton LLP

(57) ABSTRACT

A system and method for identifying a photo displays the photo with a family tree. Facial recognition, photo date estimation, people age estimation and gender determination are used to associate the displayed photo with one or more identified nodes in the family tree. A user can enter tagging information for the photo based on the identified nodes.

20 Claims, 7 Drawing Sheets

SYSTEM AND METHOD FOR ASSOCIATING A PHOTO WITH A DATA STRUCTURE NODE

BACKGROUND OF THE INVENTION

With the widespread use of digital photography and digital storage, people are collecting large numbers of photos and copies of photos. In some instances, the photos may be hardcopy or hard print photos (stored in shoe boxes, photo albums and so forth) that were taken many years before, or may be digitally stored copies of hard print photos that have been digitally scanned. In other instances, the photos may be more recently taken digital photos. While tagging photos (i.e., labeling or identifying the photos with pertinent information, such as who is in the photo, where the photo was taken, and when it was taken), is desirable in order to organize the photos for future retrieval and use, this is becoming increasingly difficult because of the large number of photos that most people collect, the amount of time that it takes to individually view and identify each photo, and in some cases, the age of the photo or other factors that make it difficult to accurately identify any given photo.

BRIEF SUMMARY OF THE INVENTION

There is provided, in accordance with embodiments of the present invention, a network/system and method for identifying photos, e.g., in order to organize the photos and make them accessible to a user.

In one embodiment, method for identifying a photo is implemented using a displayed data structure. The method includes displaying at a user interface a photo and a data structure. The data structure has a plurality of data nodes, each node representing one or more data records pertaining to a subject. The method further includes determining whether there is a relationship between the displayed photo and one or more of the data nodes, and identifying at the displayed data structure any data node that has a relationship to the displayed photo.

In some embodiments, the displayed photo has a facial image, and the data structure is a family tree, with each data node associated with a person in the family tree. Determining whether there is a relationship between the displayed photo and one of the data nodes comprises determining whether there is a match between the person in the facial image and a person associated with one of the data nodes. Tagging information for the photo is entered by a user based on the identification of the relationship between the displayed photo and a data node.

A more complete understanding of the present invention may be derived by referring to the detailed description of the invention and to the claims, when considered in connection with the Figures.

DETAILED DESCRIPTION OF THE INVENTION

Figure 1:
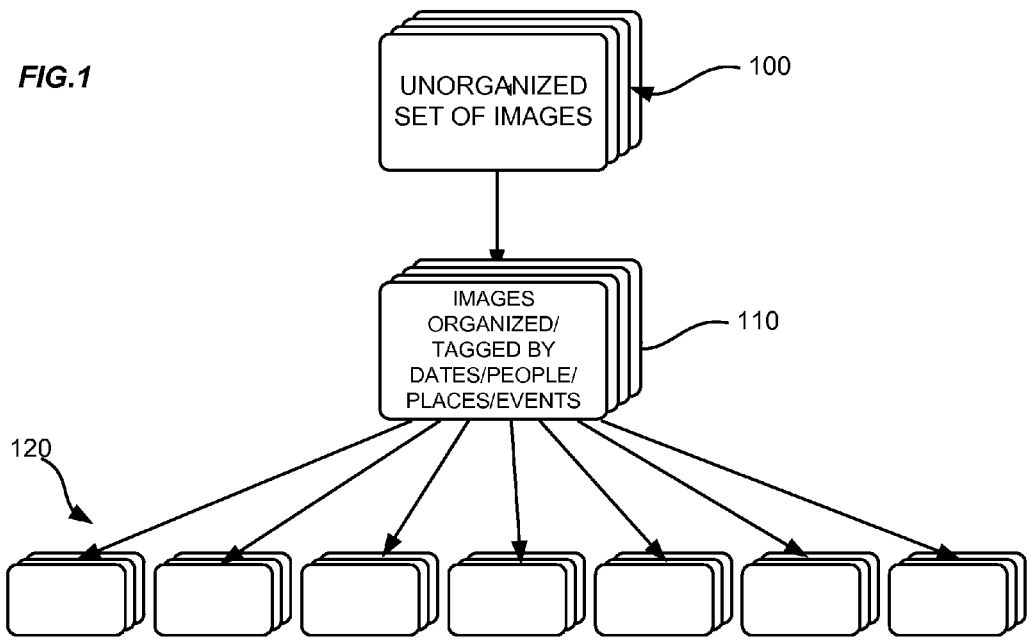
FIG. 1 illustrates identifying and organizing a set of photos in accordance with one embodiment of the invention

There are various embodiments and configurations for implementing the present invention. Generally, embodiments provide systems and methods for identifying photos or other images using a data structure, such as a family tree. An association is made between a displayed photo and one or more data nodes of the data structure.

In one embodiment, a set of photos that has not been organized or identified are individually presented or displayed to a user at a user interface. A family tree is also displayed to the user. The family tree includes interconnected icons or nodes that each represent a person and that have data or records pertaining to that person stored in relation to the node at a database. In some embodiments, the data at the node can include digitally stored photos of the person represented by the node. An association is made between the displayed photo and a node of the displayed family tree by comparing a facial image in the displayed photo to facial images in stored photos of persons represented at the family tree nodes. If an association is made, then a node is identified at the displayed family tree for the user, so that the user can then enter identifying information pertaining to the photo (such as the name of the person at the node, and information concerning a likely date, event or location for the photo).

In other embodiments, alternative methods are provided for making an association between a displayed photo and a family tree node. For example, the age of the displayed photo could be estimated, and based on an estimated date or time-frame during which the photo was taken, one or more nodes (that represent people in the family tree who were living at the estimated date or time frame) are identified, to aid to the user in establishing whether the photo is of a person represented by one of the identified nodes.

In yet other embodiments, the ages of people whose faces appear in the displayed photo can be estimated. Using an estimated age, and other information (such as recognized facial images and/or an estimated date of the photo), one or more nodes can be identified for the user, which is some instances might include identifying multiple people in the displayed photo, e.g., people over several generations. In an alternative embodiment, the gender of people in the displayed photo can be used to facilitate the association with a data node.

Other embodiments of the present invention can be used to associate a photo with any form of data structure. As one example only, a data structure may represent employees or other people that are associated with an organization. A displayed photo can be matched to a photo (or other data) stored for any one of those employees or people.

It should be appreciated that in its broadest sense, the present invention can be used to make any association (or determine any relationship) between a displayed photo and data records at a data structure. Any data (or images) represented in a displayed photo or image can be used to determine a relationship. For example, objects or things (other than faces) in a photo can be identified (such as vehicles, places, and events) and evaluated for some relationship to data records stored in conjunction with a data structure node. As an example, an event known to have occurred on a specific date and captured in a photo can be compared to events or dates represented in data records stored at a data node in order to find a relationship. Further, metadata that may have been stored in relation to a digitally stored photo (such as the date the photo was taken, or the type of equipment used to take the picture) can be identified and evaluated for some relationship to data records stored within a data structure. Thus, in its broadest sense, the present invention can be used to make an association or determine a relationship between any feature, characteristic or subject in a photo and a data record that may be maintained in a data structure. In such way, a user viewing the displayed photo and an associated data node or record can use such an association or relationship to identify or "tag" the photo with appropriate identifying information so that the photo can be organized (associated with related photos or other records) or subsequently retrieved based on the identifying information.

Referring now to FIG. 1, there is illustrated a set of untagged photos or images 100 that can be identified and organized according to features of the present invention. As illustrated, the photos 100 are not organized (or identified), and can relate to numerous people, events, places or things for which a user may not have information or other means to identify. In some instances the photos may be hardcopy prints that may have been stored in a box or album, and may have many different formats, styles and sizes (e.g., from having been taken over many years). As will be more fully described below, if the photos are hardcopies, the photos are scanned and digitally stored. In some instances, the user may have photos already in digital form, either because they have been previously scanned or they may have been originally taken with a digital camera and downloaded to a storage device.

In accordance with some embodiments herein, information concerning the photos is obtained so that the images can be identified and stored as categorized or organized images 110. It should be appreciated that by being organized, the photos are not necessarily stored together, but rather are classified or "tagged" with identifiers (such as information concerning a person in the photo, where it was taken, when it was taken, or an event that it captures), in such a way the photos can be retrieved and viewed by using the identifiers. As an example, a user might want to view all photographs concerning his or her grandfather and, using the grandfather's name as an identifier, retrieve all digitally photos that have been tagged with the grandfather's name. As illustrated in FIG. 1, tagged photos might be classified or organized into groups 120. For example, each of the groups of photos 120 may have a common tag or identifier. In some instances, a photo may have multiple tags (for example, multiple people, events, locations or a combination thereof) and one photo may be assigned to or classified in more than one of the groups 120.

While the described embodiments relate to tagging still photos (as illustrated in FIG. 1), it should be appreciated that the invention has application to other forms of images, such as motion pictures and videos.

Figure 2:
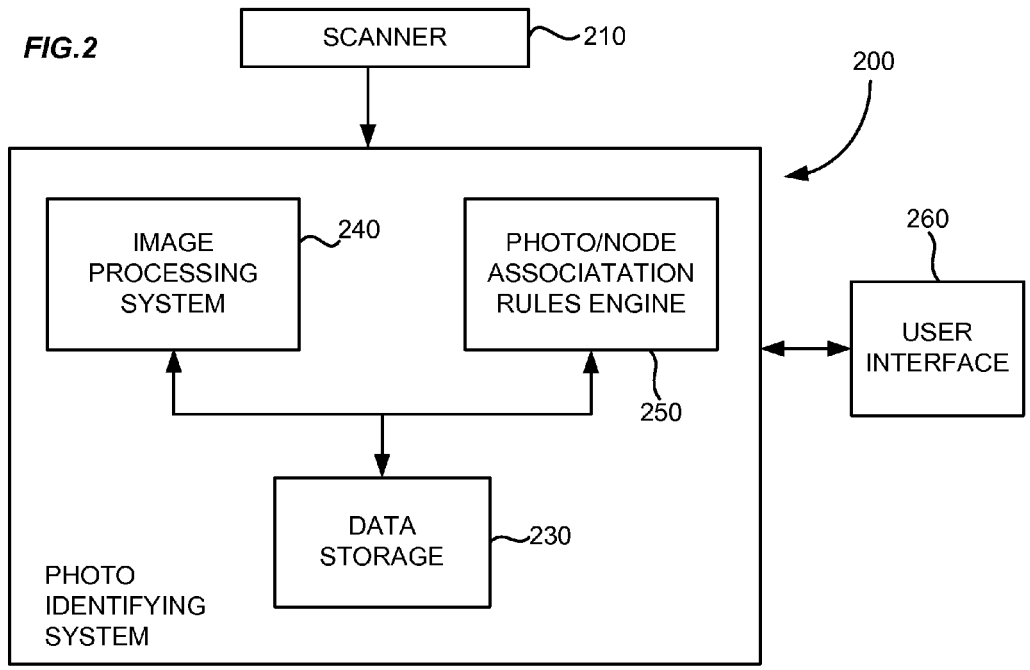
FIG. 2 is a block diagram of a system for identifying photos in the manner illustrated in FIG. 1.

Turning now to FIG. 2, there is seen a photo identifying system 200 in accordance with one embodiment of the invention. The system 200 receives digitally scanned photos from a scanner 210, with the scanned photos stored in a database or data storage device 230. As noted earlier, in some cases, photos or images may be received by the system 200 in digital form without having to be scanned (e.g., photos that were originally taken with a digital camera). In the present embodiment, family tree information is also stored in storage device 230. Family tree structures and information associated therewith will be illustrated and described later, but briefly, the family tree information may include various data records for each person represented in the family tree, including basic information (such as name, birth date, birthplace, date of death and similar information taken from historical records and vital statistics), various documents and records (including photos) that have been digitally scanned and stored in association with each person, and the relationships between people or between nodes. The structure of a family tree and its represented information, and the manner in which various records (including images and photos) can be stored in association with each person or node in a family tree, are known and are described, for example, in commonly owned U.S. patent application Ser. No. 13/049,671, filed Mar. 16, 2011, by Donald B. Curtis, for METHODS AND SYSTEMS FOR IDENTIFICATION AND TRANSCRIPTION OF INDIVIDUAL ANCESTRAL RECORDS AND FAMILY, U.S. patent application Ser. No. 13/035,816, filed Feb. 25, 2011, by Matt Rasmussen, et al., for METHODS AND SYSTEMS FOR IMPLEMENTING ANCESTRAL RELATIONSHIP GRAPHICAL INTERFACE, and U.S. patent application Ser. No. 12/511,009, filed Jul. 28, 2009, by David Graham et al., for SYSTEMS AND METHODS FOR THE ORGANIZED DISTRIBUTION OF RELATED DATA, each of which is hereby incorporated by reference. Aforementioned U.S. patent application Ser. No. 13/049,671 also discloses techniques for selecting portions of documents, highlighting those portions (for user recognition), and moving those data portions to fields of a data record or node in a family tree.

Also seen in the system 200 is an image processing system 240 for processing and analyzing various data and characteristics associated with a photos digitally scanned at scanner 210, and a rules engine 250 which implements logic for associating a photo (such as one scanned at scanner 210) with photos or other data that might be stored at one of the nodes in a family tree. A user interface 260 permits a user to interact with the system 200, and may include various input and output devices (e.g., keyboard, mouse, display, and so forth).

Figure 3:
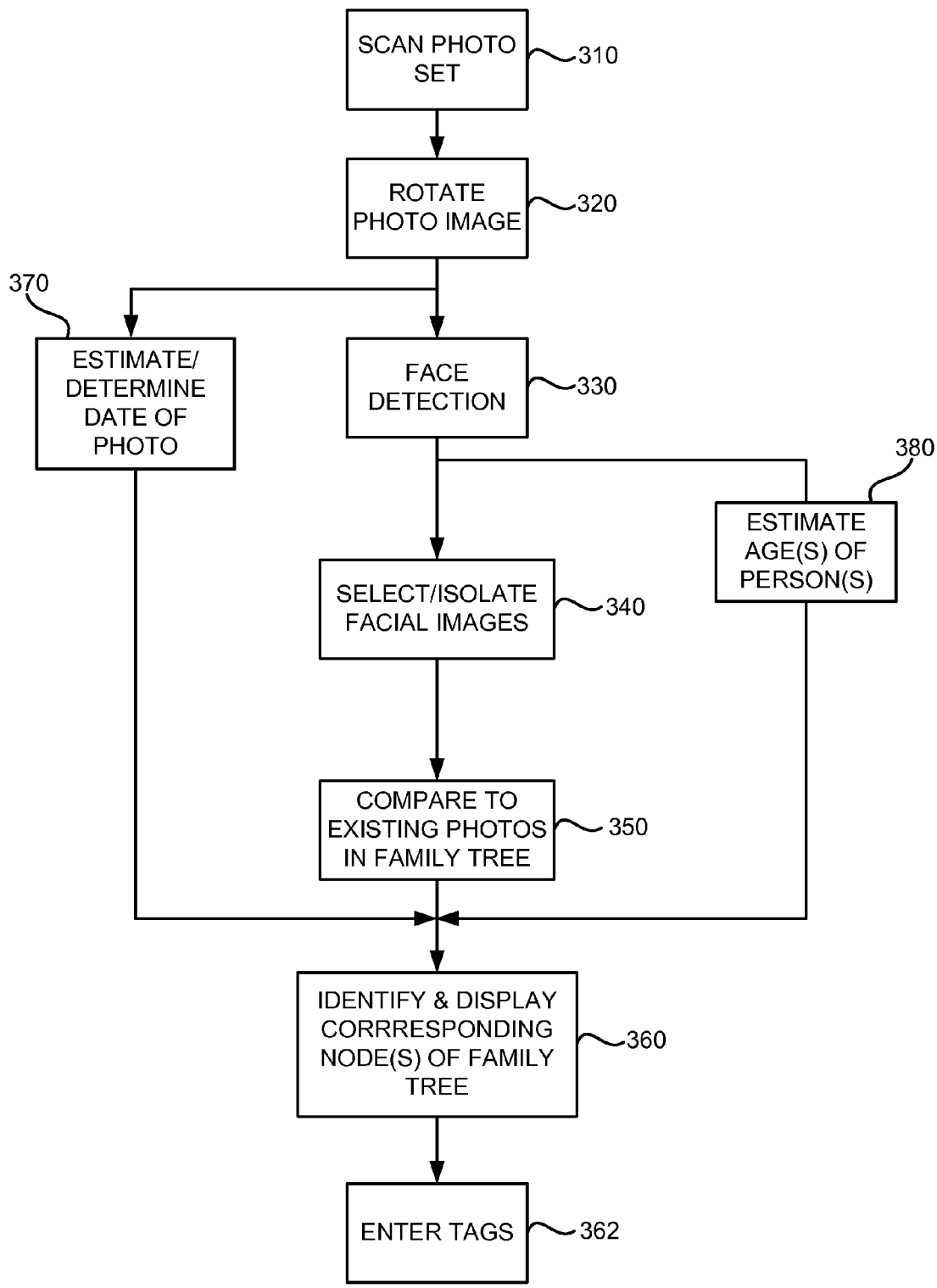
FIG. 3 is a flow diagram illustrating a method for identifying photos using the system of FIG. 2.

Turning to FIG. 3, a process is shown for associating a scanned photo with data records that are stored in relation to a person at a node of a family tree, using the system 200. In the embodiment illustrated in FIG. 3, it is anticipated that the user of the system 200 might have a stack of hardcopy print photos which are not organized and for which identifying information is missing or incomplete. The photos are scanned to provide digital copies at step 310, using a scanner 210, which in one embodiment may be a KODAK i600 Series Document Scanner or similar system. The scanned images from the scanner are stored in data storage device 230. As mentioned earlier, in some instances digital images may be available (rather than print copies of photos), and could be inputted to the system 200 from a storage medium such as a compact disc, from a digital camera, or from other sources, such as a server storing photos at an online photo album website.

The photo (and its overall image) is then processed using image processing system 240 in conjunction with the logic in rules engine 250.

At step 320, each photo or photo image is rotated, if necessary, to put the photo in the proper orientation. As will be discussed below, each scanned image can be viewed individually on a display to facilitate identifying any association to a corresponding node of a family tree. Having the proper orientation of the photo will make it easier and more efficient to view each photo. In addition, a proper orientation of each photo may also assist in the proper detection of faces on the photos (as will be described shortly). Software systems for determining the proper orientation of a photo are known, and are described, for example, in U.S. Pat. No. 7,215,828, issued to Jiebo Luo et al. and U.S. Pat. No. 8,036,417, issued to Andrew Gallagher et al.

One feature of the described embodiment is associating a photo with a family tree node by facial recognition, by detecting a face (or facial image) on a photo and comparing such facial image to images stored in relation to people in the family tree. Accordingly, at step 330, any faces (facial images) in an individual photo (scanned at step 310) are detected by image processing system 240, using rules and logic in the rules engine 250. Many techniques for detecting a face in a photo are known, such as described in U.S. Patent Application Publication No. 2007/0098303 of Andrew Gallagher et al. and various publications and references discussed therein. In one embodiment, facial characteristics are identified in the detected face, based on locations of facial feature points (e.g., eyes, nose, mouth and various components thereof). The facial features can also include distances between specific feature point angles formed by lines connecting sets of specific feature points, or coefficients of projecting the feature points onto principal components that describe the variability in facial appearance. Further details on identifying facial features can be found in aforementioned U.S. Patent Application Publication No. 2007/0098303, as well as Jones, M. J.; Viola, P., "Fast Multi-view Face Detection," IEEE Conference on Computer Vision and Pattern Recognition (CVPR), June 2003; Yuille et al. in, "Feature Extraction from Faces Using Deformable Templates," Int. Journal of Comp. Vis., Vol. 8, Issue 2, 1992, pp. 99-111; T. F. Cootes and C. J. Taylor "Constrained Active Appearance Models," 8th International Conference on Computer Vision, volume 1, pages 748-754, IEEE Computer Society Press, July 2001; and "An Automatic Facial Feature Finding System For Portrait Images," by Bolin and Chen in the Proceedings of IS&T PICS conference, 2002.

A detected face or facial image in the photo is selected or isolated by or for the user at step 340. In some embodiments, the selection of a facial image may be done by the user. For example, and as will be more fully described and illustrated later, a user at the user interface 260 may place a cursor or pointer (e.g., using a mouse) over a face in the displayed photo and then select that face or facial image. The facial characteristics of the selected facial image are then compared (step 350) to the characteristics of facial images in photos stored with records at the family tree nodes (within database 230). In other embodiments, if there are several facial images (for different people) in the photo, each facial image in the photo may be isolated by the system 200 and compared to existing photos stored in database 230. If there is a match of a face in an inputted photo and a face in an existing photo stored in database 230 (associated with a person/node in the family tree), then that person (and node) in the family tree is identified and displayed to the user, step 360.

Other steps for associating a photo with a family tree node are also illustrated in FIG. 3. At step 370, the age of the photo can be determined or estimated by image processing system 240 in conjunction with logic in rules engine 250. Various systems for determining or estimating the date of a photo are described in commonly owned U.S. patent application Ser. No. 13/440,754, for SYSTEMS AND METHODS FOR ESTIMATING/DETERMINING THE AGE OF A PHOTO, filed on even date herewith, by Christopher Brookhart et al., which is hereby incorporated by reference, and in previously referenced U.S. Pat. No. 8,036,417, issued to Andrew Gallagher et al. In some instances, step 370 might be undertaken to augment facial recognition performed in steps 330, 340 and 350, thus providing an association with a person in family tree by both facial recognition and estimating the age of the photo (e.g., find a person whose lifespan is consistent with the date of the photo, i.e., the lifespan of people in the family tree that may have been alive at the time the photo, and apply facial recognition to photos already stored for those people). Alternatively, the date of a photo could be estimated or determined only when there is no match of a facial image to a photo at step 350.

At step 380, the age of a person in a photo could be estimated, which may be particularly useful when there are multiple people in the photo. Such a feature permits several generations of people to be recognized and identified at step 360, as will be illustrated and more fully described shortly. Various systems for estimating the age of a person in a photo are described in U.S. Pat. No. 7,912,246, issued to Hankyu Moon et al., U.S. Patent Application Publication No. 2009/0192967 by Jiebo Luo et al., U.S. Patent Application Publication No. 2010/0217743 by Kazuya Ueki, and U.S. Patent Application Publication No. 2011/0222724 by Ming Yang et al., each of which is hereby incorporated by reference. While not illustrated in FIG. 3, in addition to estimating the date of a photo and the ages of the people in the photo, the gender of the people in the displayed photo could also be determined. Systems for determining the gender of a person whose face appears in a photo are known. For example, see U.S. Pat. No. 7,184,578, issued to Richard J. Simon et al. and U.S. Pat. No. 8,041,082, issued to Shumeet Baluja et al., Device Enables Computer to Identify Whether User Is Male or Female, Apr. 15, 2011 (Science Daily LLC, Rockville, Md.) available at http://www.sciencedaily.com/releases/2011/04/110405084256.htm), and *IEEE Transactions on Pattern Analysis and Machine Intelligence,* 2011; 33 (4): 858 DOI: 10.1109/TPAMI.2010.208. Thus, in conjunction with the estimated age of a person, gender determination would provide an even stronger association between a person in a photo and a person represented at a node of a family tree.

After a node has been associated with a photo at step 360, the user can tag the photo (step 362) based on that association, for example, by using a keyboard at the user interface 260. For example, the user may enter the name of the person that has been identified at the displayed family tree node at step 360. In some embodiments, where the system 200 also manages the family tree and has access to all of the data stored with the family tree, information from the family tree (such as a person's name) could be automatically added as a tag for the photo. In addition, the identification of a person in a family tree at step 360 could lead the user to infer certain things about the photo, such as a date or event, which could then be entered as a tag by the user. As just one example, if a photo were of a wedding, and either the bride or groom in the photo were identified by the node displayed at step 360, the user could enter tagging information such as the date of the wedding and other information about the event (the location of or particular people in the wedding), if known to the user. As should be appreciated, in some instances, where a definite association is made with a person at a family tree node, the user might also store the photo with other records at the family tree node. As one example only, a photo could be placed at a node (and thus stored in data storage device 230 in association with other data for the person represented at the node) using a "drop and drag" technique, such as described in commonly owned U.S. patent application Ser. No. 13/440,586, for SYSTEMS AND METHODS FOR ORGANIZING DOCUMENTS, filed on even date herewith, by Christopher Brookhart et al., which is hereby incorporated by reference.

Figure 4:
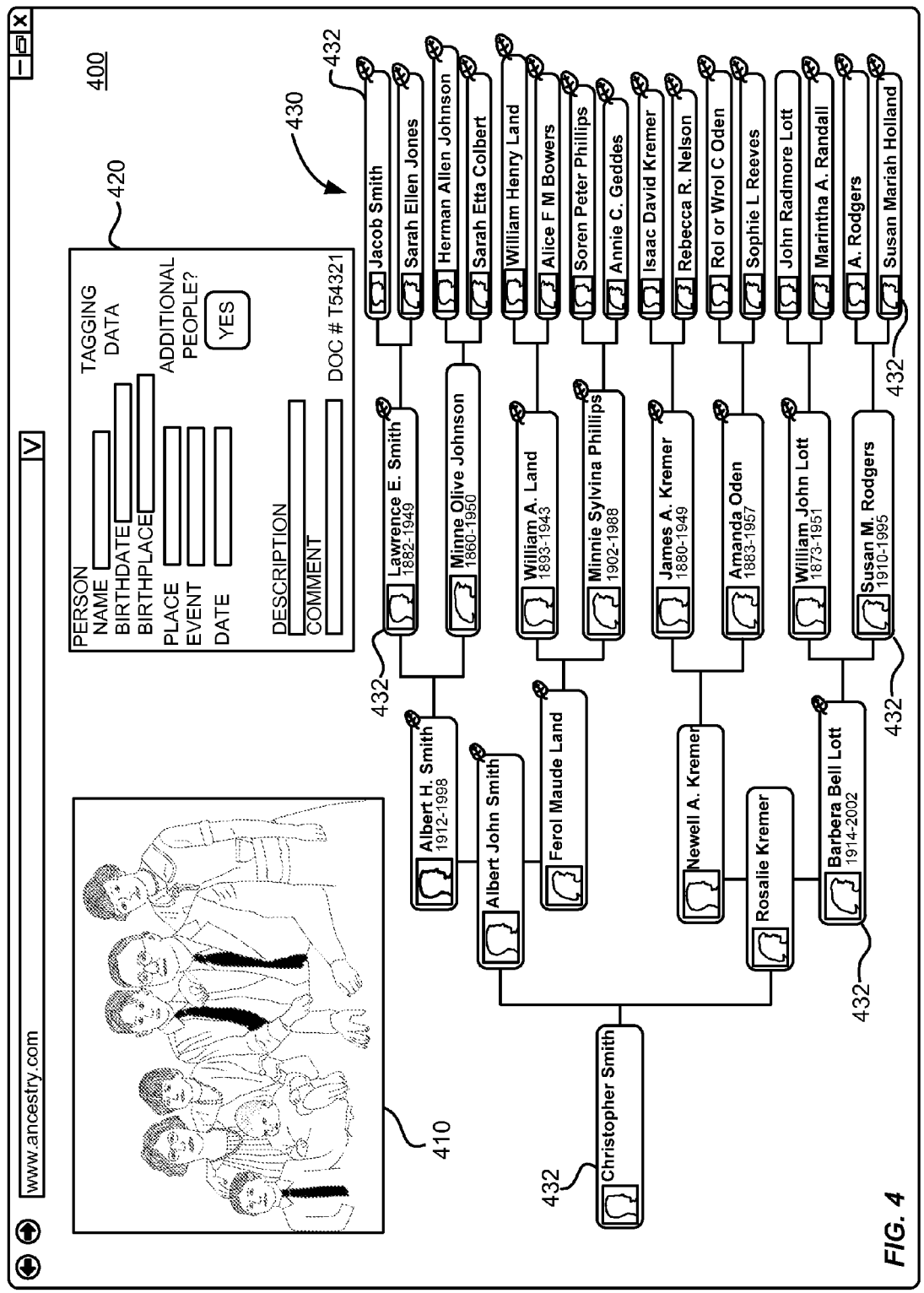
FIGS. 4 through 7 illustrate various displays that might be seen on the user interface of the system seen in FIG. 2.

Turning now to FIG. 4, there is shown a screen display 400 at the user interface 260 according to one embodiment of the invention. The display includes a displayed photo 410 that has been previously scanned and stored at the system 200, a tagging input window 420 for entering information for the photo, and a family tree 430 for use in associating the photo with a person. The family tree 430 has a plurality of nodes 432, each representing a person in the tree (across multiple generations), and interconnected to show relationships (e.g., parent/child). In the display 400, the photo 410 has not yet been associated with a specific node in the family tree 430. As illustrated by tagging input window 420, once an association has been made, the user can enter one or more pieces of tagging or identifying information concerning the photo 410, such as information on a person, place, or event, as well as a text description or comment concerning the photo. It should be appreciated that the family tree 430 illustrated in FIG. 4 may only represent part of a much larger tree. How much of the tree to display could be determined by the user, or could be determined by system 200 based on an association made between a photo and a node in the family tree.

Turning now to FIG. 4, there is shown a screen display 400 at the user interface 260 according to one embodiment of the invention. The display includes a displayed photo 410 that has been previously scanned and stored at the system 200, a tagging input window 420 for entering information for the photo, and a family tree 430 for use in associating the photo with a person. The family tree 430 has a plurality of nodes 432, each representing a person in the tree (across multiple generations), and interconnected to show relationships (e.g., parent/child). In the display 400, the photo 410 has not yet been associated with a specific node in the family tree 430. As illustrated by tagging input window 420, once an association has been made, the user can enter one or more pieces of tagging or identifying information concerning the photo 410, such as information on a person, place, or event, as well as a text description or comment concerning the photo. It should be appreciated that the family tree 430 illustrated in FIG. 4 may only represent part of a much larger tree. How much of the tree to display could be determined by the user, or could be determined by system 200 based on an association made between a photo and a node in the family tree.

Figure 5:
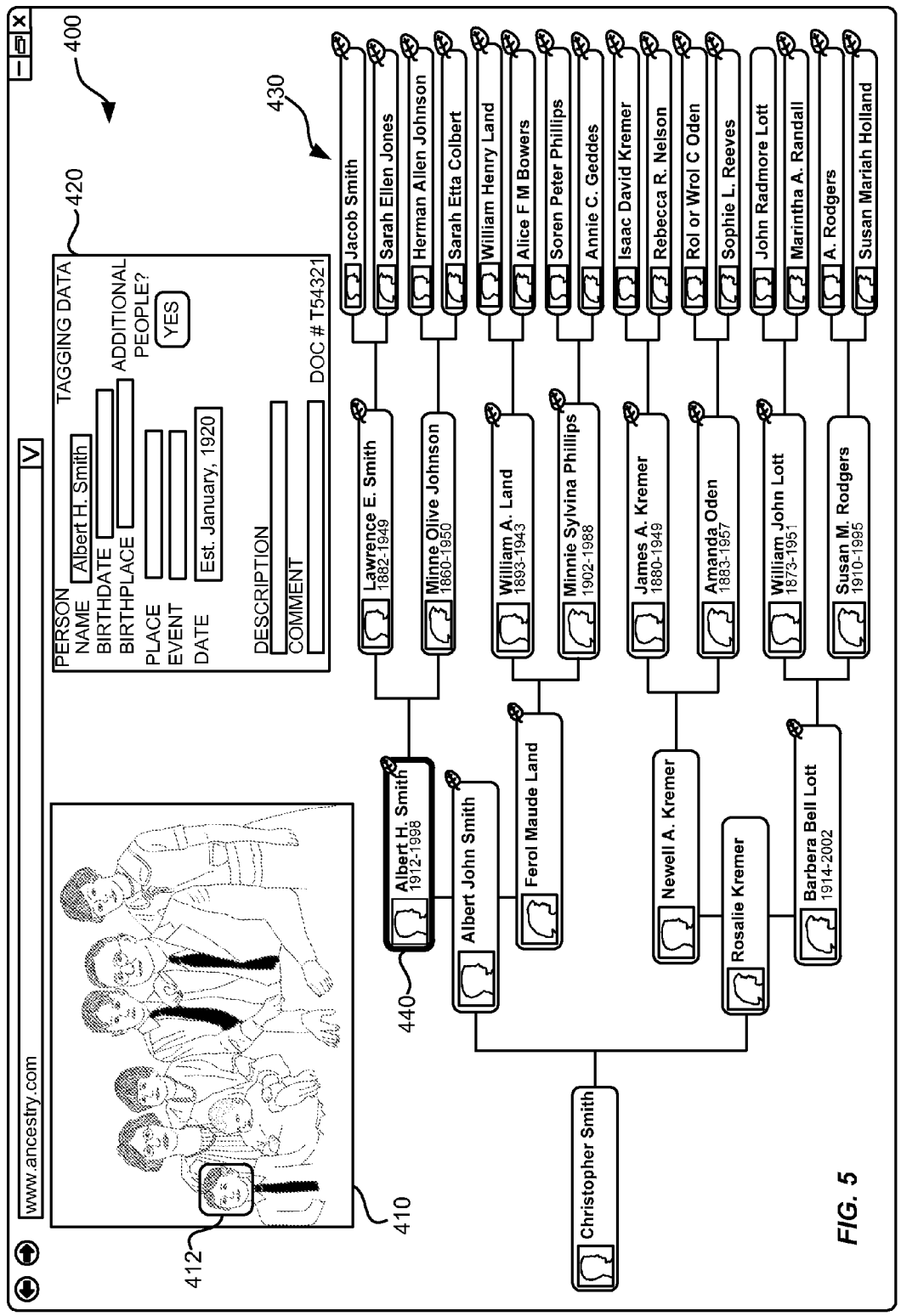

FIG. 5 is a view similar to FIG. 4, but showing an association that has been made by comparing the facial images in the displayed photo 410 to photos stored with data records at the nodes of the family tree 430. As illustrated in FIG. 5, the system 200 has recognized one facial image and identified that person in the photo (using a graphical outline 412) as the same person represented by a node that has been highlighted with a graphical outline 440 in the family tree. Once the association has been made, the user can enter tagging information at tagging input window 420, such as the name of the person ("Albert H. Smith"). The user may also be able to infer other information once an association has been made, such as a place, event, or date. If so, that information can be entered at in the window 420. As also noted earlier, in one embodiment the date or age of the scanned photo can be estimated, and the window 420 might have the estimated date or time frame (and other information) automatically populated within the appropriate information field (e.g., "Est. January, 1920" in the Date field).

Figure 6:
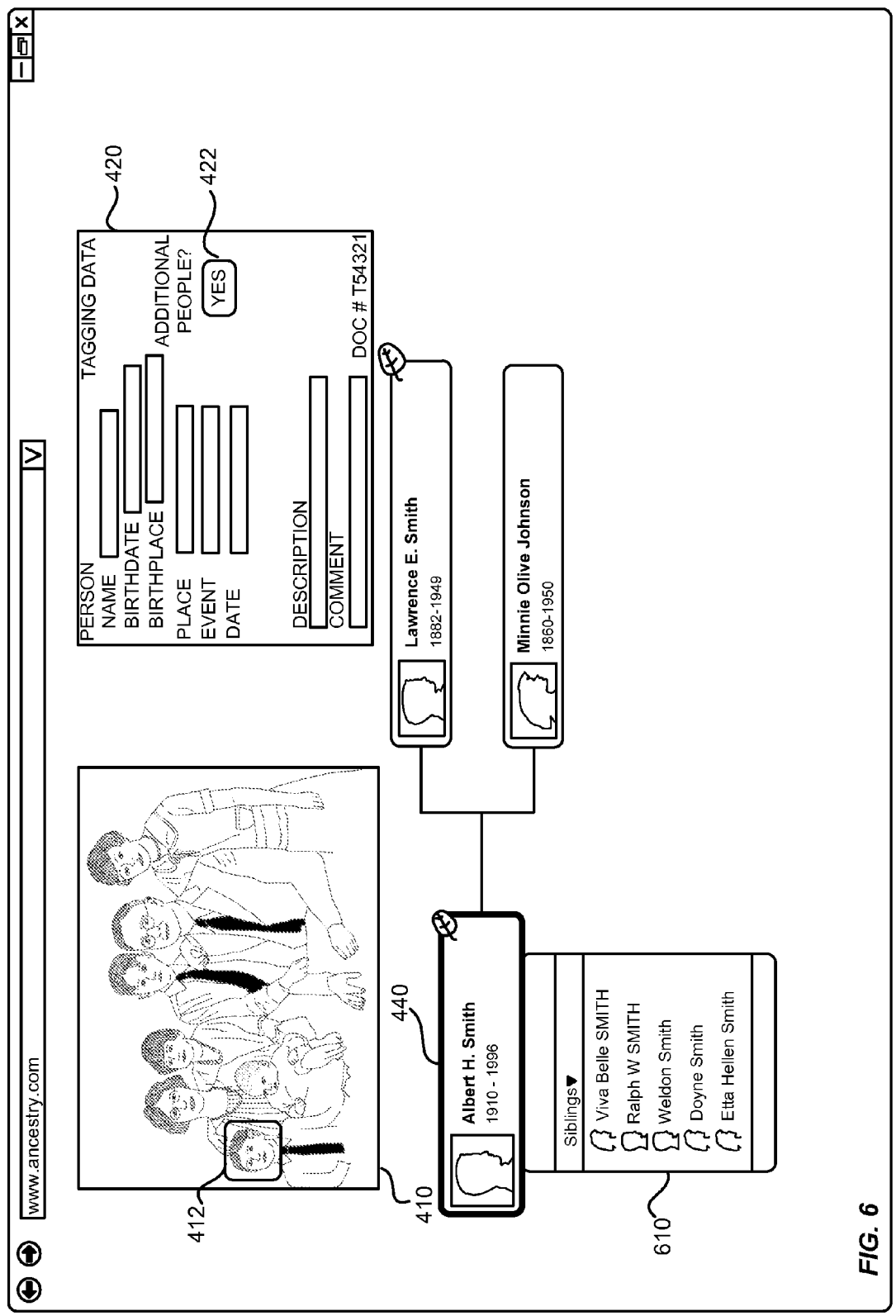

In a screen display seen in FIG. 6, the system 200 has also used age estimation features on both the individual that has been recognized and other individuals whose facial images appear in the photo 410. As mentioned earlier, age estimation can be useful when a photo has multiple people, especially when more than one generation might be represented. In the photo 410, through age estimation, there are two adults and five children recognized. Given the likelihood of multiple generations (e.g., approximate 20 years difference between the youngest adult and the oldest child), and the ages of the various individuals, the rules engine 250 in system 200 determines that there are likely two generations represented, and (given the estimated ages) that the known recognized individual ("Albert H. Smith") is possibly a sibling of the other children and that the two adults are possibly parents of the five children. As a result of this determination, the system 200 displays those portions of the family tree represented by the generations of the known individual and his parents. In the view seen in FIG. 6, the known individual and his siblings (drop down box 610) are displayed in the family tree, as well as the parents. This enables the user to add tagging information concerning the other people in the photo (by selecting a "yes" button 422 at the "Additional People" prompt in window 420), if the user believes he or she can in fact infer such additional tagging information (at least to a reasonable degree of confidence). If additional people in the photo are to be identified, additional tagging information is entered for the photo 410 using an additional window (not shown) for adding personal information for each person.

Figure 7:
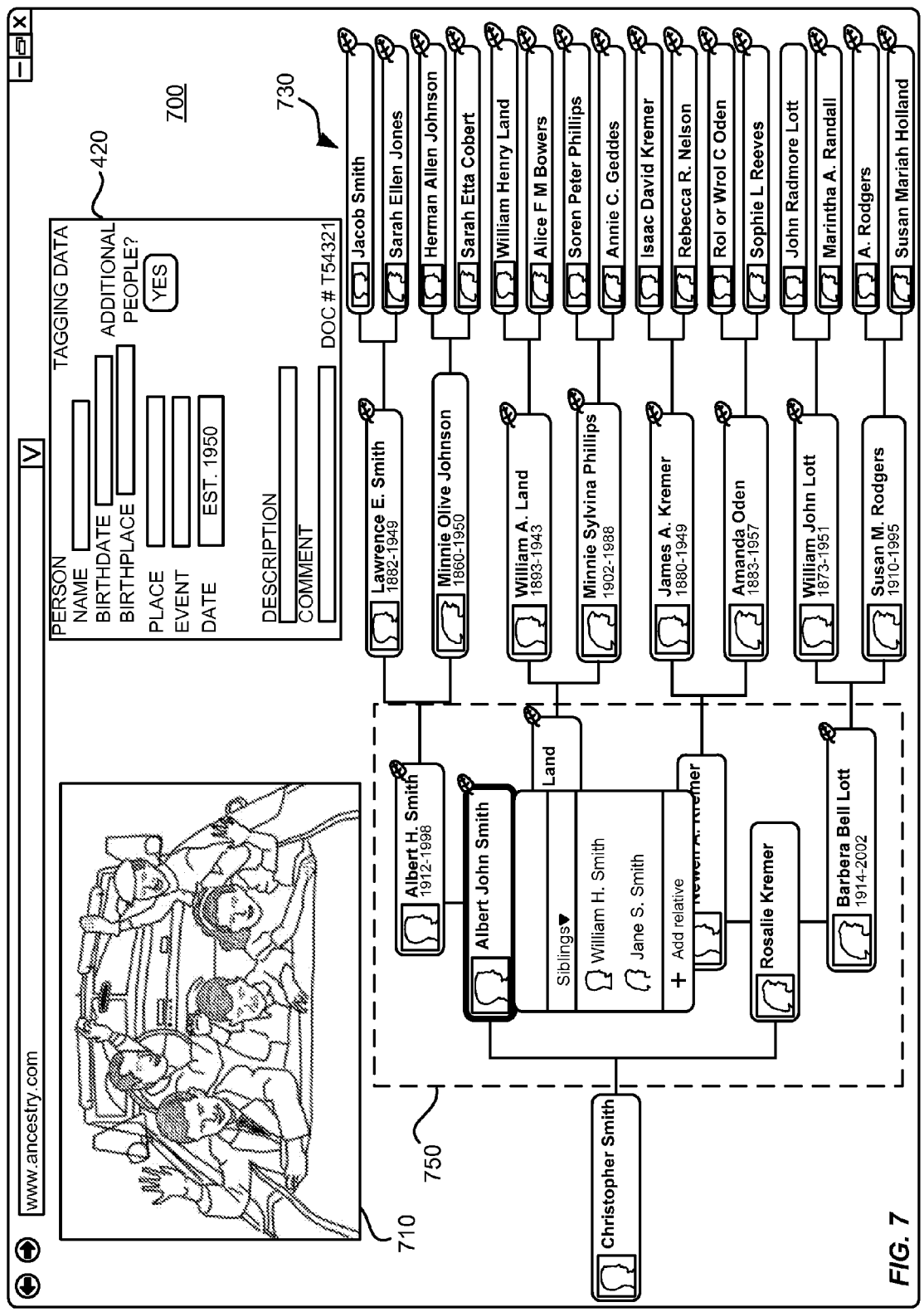

FIG. 7 illustrates a screen display 700 in accordance with another embodiment of the invention, in which there has been no facial recognition, that is, a face within a displayed photo 710 has not been matched to a facial image stored at nodes of a family tree 730. In FIG. 7, the system 200 uses the estimated date of the photo and the estimated ages of the people in the photo to display nodes within the family tree 730 having a likely or possible association with the photo. In this particular case, the photo 710 has been estimated as having a date (time frame) of 1950, and the ages of the individuals in the photo have been estimated such that there appear to be two adults (approximately 40 and 37 years old) and three children (approximately 12, 8 and 6 years old). Thus, in the family tree 730 seen in display of FIG. 7, the two generations that would match this time frame and those ages are highlighted, by graphical outline 750. The user then enters data in tagging input window 740 with any information concerning the displayed photo that can be inferred by the user from the identified nodes.

As noted earlier, an even stronger association between a person in the photo and a family tree node can be made by gender determination, and people with the appropriate gender could be further highlighted (not illustrated in FIG. 7).

Figure 8:
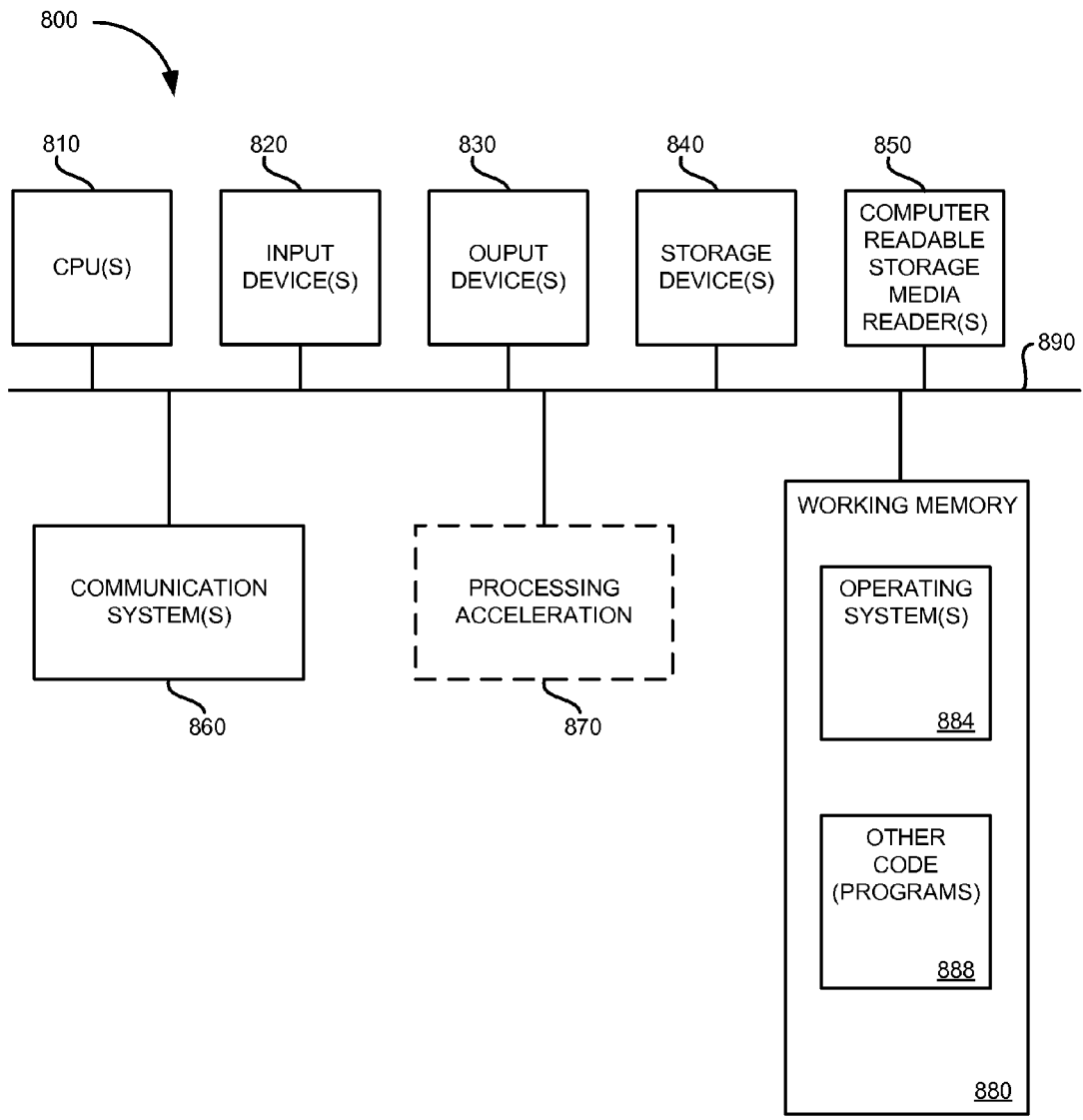
FIG. 8 is a block diagram illustrating an exemplary computer system upon which various embodiments of the invention may be implemented.

FIG. 8 is a block diagram illustrating an exemplary computer system upon which embodiments of the present invention may be implemented. This example illustrates a computer system 800 such as may be used, in whole, in part, or with various modifications, to provide the functions of database or data storage device 230, image processing system 240, rules engine 250, and user interface 260, as well as other components and functions of the invention described herein.

The computer system 800 is shown comprising hardware elements that may be electrically coupled via a bus 890. The hardware elements may include one or more central processing units 810, one or more input devices 820 (e.g., a mouse, a keyboard, etc.), and one or more output devices 830 (e.g., a display device, a printer, etc.). The computer system 800 may also include one or more storage devices 840, representing remote, local, fixed, and/or removable storage devices and storage media for temporarily and/or more permanently containing computer-readable information, and one or more storage media reader(s) 850 for accessing the storage device(s) 840. By way of example, storage device(s) 840 may be disk drives, optical storage devices, solid-state storage device such as a random access memory ("RAM") and/or a read-only memory ("ROM"), which can be programmable, flash-updateable or the like.

The computer system 800 may additionally include a communications system 860 (e.g., a modem, a network card—wireless or wired, an infra-red communication device, a Bluetooth™ device, a near field communications (NFC) device, a cellular communication device, etc.). The communications system 860 may permit data to be exchanged with a network, system, computer, mobile device and/or other component as described earlier. The system 800 also includes working memory 880, which may include RAM and ROM devices as described above. In some embodiments, the computer system 800 may also include a processing acceleration unit 870, which can include a digital signal processor, a special-purpose processor and/or the like.

The computer system 800 may also comprise software elements, shown as being located within a working memory 880, including an operating system 884 and/or other code 888. Software code 888 may be used for implementing functions of various elements of the architecture as described herein. For example, software stored on and/or executed by a computer system, such as system 800, can be used in implementing the process seen in FIG. 3 and the logic in the rules engine 250.

It should be appreciated that alternative embodiments of a computer system 800 may have numerous variations from that described above. For example, customized hardware might also be used and/or particular elements might be implemented in hardware, software (including portable software, such as applets), or both. Furthermore, there may be connection to other computing devices such as network input/output and data acquisition devices (not shown).

While various methods and processes described herein may be described with respect to particular structural and/or functional components for ease of description, methods of the invention are not limited to any particular structural and/or functional architecture but instead can be implemented on any suitable hardware, firmware, and/or software configuration. Similarly, while various functionalities are ascribed to certain individual system components, unless the context dictates otherwise, this functionality can be distributed or combined among various other system components in accordance with different embodiments of the invention. As one example, the system 200 system may be implemented by a single system having one or more storage device and processing elements. As another example, the system 200 may be implemented by plural systems, with their respective functions distributed across different systems either in one location or across a plurality of linked locations.

Moreover, while the various flows and processes described herein (e.g., those illustrated in FIG. 3) are described in a particular order for ease of description, unless the context dictates otherwise, various procedures may be reordered, added, and/or omitted in accordance with various embodiments of the invention. Moreover, the procedures described with respect to one method or process may be incorporated within other described methods or processes; likewise, system components described according to a particular structural architecture and/or with respect to one system may be organized in alternative structural architectures and/or incorporated within other described systems. Hence, while various embodiments may be described with (or without) certain features for ease of description and to illustrate exemplary features, the various components and/or features described herein with respect to a particular embodiment can be substituted, added, and/or subtracted to provide other embodiments, unless the context dictates otherwise. Consequently, although the invention has been described with respect to exemplary embodiments, it will be appreciated that the invention is intended to cover all modifications and equivalents within the scope of the following claims.

What is claimed is:

1. A method for identifying a photo using a data structure, wherein the data structure is a family tree representing genealogical information, and wherein there are multiple facial images in the photo, the method comprising:

displaying a photo at a user interface;

displaying at the user interface a data structure having a plurality of data nodes, each data node representing one or more data records associated with a person;

determining whether there is a relationship between the displayed photo and one or more of the data nodes;

identifying at the displayed data structure any data node that has a relationship to the displayed photo, by selecting one of the data nodes at which there is a match of characteristics of the person associated with that node to a person represented by a facial image in the displayed photo;

presenting the selected one data node in the family tree to a user at the user interface;

estimating the age of the person corresponding to each facial image in order to determine the number of generations represented by the photo;

selecting nodes corresponding to those generations in the family tree; and presenting the nodes corresponding to those generations in addition to the selected one node.

2. The method of claim 1, wherein the step of determining whether there is a relationship comprises:

detecting one or more facial images in the displayed photo;

identifying characteristics of the detected facial images in the displayed photo; and determining if there is a match between the identified characteristics of detected facial images in the displayed photo and characteristics of the person associated with the one of the data nodes.

3. The method of claim 2, wherein the step of determining if there is a match comprises determining if there is a match between characteristics of detected facial images in the displayed photo and characteristics of a facial image in a photo stored at the one of the data nodes.

4. The method of claim 1, wherein the step of presenting the selected one node comprises highlighting at the user interface the selected one data node in the data structure.

5. The method of claim 4, further comprising:

selecting nodes adjacent the selected one node and presenting the adjacent nodes along with the one selected node.

6. The method of claim 1, wherein each data node is associated with a person in the family tree, wherein the relationship between the displayed photo and the one of the data nodes is a relationship between the age of the displayed photo and the lifespan of a person associated with the one of the data nodes.

7. The method of claim 6, wherein the step of identifying at the displayed data structure any data node that has a relationship to the displayed photo further comprises:

estimating the age of the displayed photo in order to estimate the date the photo was taken;

determining the lifespan of each person associated with data nodes in the data structure; and selecting a data node associated with a person having a lifespan that corresponds to the estimated date that the displayed photo was taken.

8. The method of claim 7, further comprising:

estimating the ages of persons represented by facial images in the displayed photo; and using the estimated ages of persons represented by facial images in the displayed photo to determine likely generational relationships between persons in the displayed photo; and wherein the step of selecting a data node is based on the determined likely generational relationships in addition to the lifespan of each person that corresponds to the estimated date that the displayed photo was taken.

9. The method of claim 1, wherein each data node is associated with a person in the family tree, wherein the relationship between the displayed photo and the one of the data nodes is the gender of a person appearing in the displayed photo and the gender of a person associated with the one of the data nodes.

10. The method of claim 1, further comprising:
receiving tagging information at a user interface concerning the displayed photo based on the identified data node.

11. A method for identifying a photo using the relationship of the photo to a data structure, comprising:
displaying a photo having multiple facial images at a user interface;
displaying at the user interface a family tree data structure having a plurality of data nodes, each data node representing one or more data records pertaining to a person associated with that data node, wherein at least some of the data nodes include photos having a facial image of the person associated with each of the at least some of the data nodes;
determining whether there is a relationship between the displayed photo and at least one of the data nodes by comparing characteristics of the facial images in the displayed photo to characteristics of the facial image in the photos at the at least some of the data nodes;
identifying at the user interface any data node in the displayed data structure that has a relationship to the displayed photo, by selecting one of the data nodes that has the relationship;
presenting the selected one data node in the family tree to a user at the user interface;
estimating the age of the person corresponding to each facial image in the displayed photo in order to determine the number of generations represented by the photo;
selecting nodes corresponding to those generations in the family tree; and
presenting the nodes corresponding to those generations in addition to the selected one node; and
receiving tagging information at a user interface concerning the displayed photo based on the identified data node.

12. A system for identifying a photo using a data structure, wherein the data structure is a family tree representing genealogical information, and wherein there are multiple facial images in the photo, the system comprising one or more processors programmed to:
display a photo at a user interface;
display at the user interface a data structure having a plurality of data nodes, each data node representing one or more data records associated with a person;
determine whether there is a relationship between the displayed photo and a data record at one or more of the data nodes, by selecting one of the data nodes at which there is a match of characteristics of the person associated with that node to a person represented by a facial image in the displayed photo;
identify at the displayed data structure any data node that has a relationship to the displayed photo, by selecting one of the data nodes at which there is a match of characteristics of the person associated with that node to a person represented by a facial image in the displayed photo;

present the selected one data node in the family tree to a user at the user interface;
estimate the age of the person corresponding to each facial image in order to determine the number of generations represented by the photo;
select nodes corresponding to those generations in the family tree; and
present the nodes corresponding to those generations in addition to the selected one node.

13. The system of claim 12, wherein the processors are programmed to determine whether there is a relationship by:
detecting one or more facial images in the displayed photo;
identifying characteristics of the detected facial images in the displayed photo; and
determining if there is a match between the identified characteristics of detected facial images in the displayed photos and characteristics of the person associated with the one of the data nodes.

14. The system of claim 13, wherein the processors are programmed to determine if there is a match by determining if there is a match between characteristics of detected facial images in the displayed photo and characteristics of a facial image in a photo stored at the one of the data nodes.

15. The system of claim 12, wherein the processors are programmed to present the selected one node by highlighting at the user interface the selected one data node.

16. The system of claim 15, wherein the processors are further programmed to:
select nodes adjacent the selected one node and present the adjacent nodes along with the one selected node.

17. The system of claim 12, wherein each data node is associated with a person in the family tree, wherein the relationship between the displayed photo and the one of the data nodes is a relationship between the age of the displayed photo and the lifespan of a person associated with the one of the data nodes.

18. The system of claim 17, wherein the processors are programmed to identify at the displayed data structure any data node that has a relationship to the displayed photo by:
estimating the age of the displayed photo in order to estimate the date the photo was taken;
determining the lifespan of each person associated with data nodes in the data structure; and
selecting a data node associated with a person having a lifespan that corresponds to the estimated date that the displayed photo was taken.

19. The system of claim 18, wherein the processors are further programmed to:
estimate the ages of persons represented by facial images in the displayed photo; and
use the estimated ages of persons represented by facial images in the displayed photo to determine likely generational relationships between persons in the displayed photo; and
wherein the processors are programmed to select a data node based on the determined likely generational relationships in addition to the lifespan of each person that corresponds to the estimated date that the displayed photo was taken.

20. The system of claim 12, wherein the processors are further programmed to:
receive tagging information at a user interface concerning the displayed photo based on the identified displayed node.

* * * * *